US012742859B2

(12) United States Patent
Kim et al.

(10) Patent No.: US 12,742,859 B2
(45) Date of Patent: Sep. 22, 2026

(54) DISTANCE MEASUREMENT HEAD AND MULTI-TARGET DISTANCE MEASUREMENT SYSTEM INCLUDING THE SAME

(71) Applicant: KOREA INSTITUTE OF MACHINERY & MATERIALS, Daejeon (KR)

(72) Inventors: Seung Man Kim, Daejeon (KR); Seong Heum Han, Daejeon (KR); Jeong Seok Oh, Daejeon (KR); Seung Kook Ro, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 860 days.

(21) Appl. No.: 18/019,549

(22) PCT Filed: Aug. 3, 2021

(86) PCT No.: PCT/KR2021/010154

§ 371 (c)(1),
(2) Date: Feb. 3, 2023

(87) PCT Pub. No.: WO2022/030954

PCT Pub. Date: Feb. 10, 2022

(65) Prior Publication Data

US 2024/0036170 A1 Feb. 1, 2024

(30) Foreign Application Priority Data

Aug. 4, 2020 (KR) ........................ 10-2020-0097530

(51) Int. Cl.
*G01S 7/481* (2006.01)
*G01S 17/10* (2020.01)

(52) U.S. Cl.
CPC .......... *G01S 7/4815* (2013.01); *G01S 7/4818* (2013.01); *G01S 17/10* (2013.01)

(58) Field of Classification Search
CPC ...... G01S 7/481; G01S 7/4811; G01S 7/4815; G01S 7/4818; G01S 7/483; G01S 7/4972;
(Continued)

(56) References Cited

U.S. PATENT DOCUMENTS 8,736,932 B1 5/2014 Guthals et al.
2001/0055422 A1* 12/2001 Roustaei ................. G03F 7/705 382/181

(Continued)

FOREIGN PATENT DOCUMENTS

CA 3117320 A1 * 5/2020 ........... G01S 17/931
CN 110058252 A * 7/2019 ............... G01S 7/36

(Continued)

*Primary Examiner* — Atul Trivedi
(74) *Attorney, Agent, or Firm* — LEX IP MEISTER, PLLC

(57) ABSTRACT

Disclosed is a distance measurement head which includes: a reflection surface configured to reflect a part of a laser pulse transmitted from a laser light source unit toward the laser light source unit and generate a reference pulse; a beam splitter configured to distribute a measurement pulse received from a measurement target; and a position sensor configured to receive the measurement pulse distributed by the beam splitter, in which the measurement pulse is the laser pulse reflected from the measurement target and a distance between the reflection surface and the measurement target is measured based on a time difference between time at which the measurement pulse passing through the beam splitter reaches the laser light source unit and time at which the reference pulse reaches the laser light source unit.

9 Claims, 13 Drawing Sheets

MP1
115
114
QPD (a)

(b)

(58) Field of Classification Search
CPC ......... G01S 17/08; G01S 17/10; G01B 11/02; G01B 11/026
USPC ........................................................... 356/5.1
See application file for complete search history.

(56) References Cited

U.S. PATENT DOCUMENTS

| | | | | |
|---|---|---|---|---|
| 2004/0118624 | A1* | 6/2004 | Beuhler | G01S 17/931 180/167 |
| 2007/0182949 | A1* | 8/2007 | Niclass | G01S 7/491 356/3 |
| 2015/0138325 | A1* | 5/2015 | Seo | H04N 13/254 348/49 |
| 2019/0018143 | A1* | 1/2019 | Thayer | G01S 17/89 |
| 2019/0072649 | A1 | 3/2019 | Droz et al. | |
| 2019/0086541 | A1* | 3/2019 | Kubota | G01S 7/484 |
| 2019/0154815 | A1* | 5/2019 | Oohata | G01S 17/10 |
| 2019/0227175 | A1* | 7/2019 | Steinberg | G01S 17/89 |
| 2019/0257927 | A1* | 8/2019 | Yao | G01S 7/4815 |
| 2020/0221068 | A1* | 7/2020 | Schmidt | B60Q 1/04 |
| 2022/0187471 | A1* | 6/2022 | Eshel | G01S 17/89 |
| 2022/0357452 | A1* | 11/2022 | Hofrichter | G01S 17/10 |
| 2024/0085518 | A1* | 3/2024 | Eberspach | G01S 17/66 |
| 2025/0035756 | A1* | 1/2025 | Shi | G01S 7/4863 |

FOREIGN PATENT DOCUMENTS

| | | | | |
|---|---|---|---|---|
| EP | 3159711 | A1 * | 4/2017 | G01S 7/4814 |
| EP | 3301477 | A1 * | 4/2018 | G01S 7/4865 |
| EP | 3301478 | A1 * | 4/2018 | G01S 17/86 |
| EP | 3301480 | A1 * | 4/2018 | G01S 17/931 |
| EP | 3477339 | A1 * | 5/2019 | G01S 17/10 |
| EP | 3550329 | A1 * | 10/2019 | G01S 17/10 |
| JP | 2011237271 | A * | 11/2011 | |
| JP | 2012037733 | A * | 2/2012 | |
| JP | 2014059301 | A * | 4/2014 | G01S 17/89 |
| JP | 2017-138110 | | 8/2017 | |
| JP | 2018531374 | A * | 10/2018 | G01S 17/42 |
| JP | 2019-522211 | | 8/2019 | |
| KR | 10-1109001 | | 1/2012 | |
| KR | 10-2018-0028230 | | 3/2018 | |
| KR | 10-2018-0127706 | | 11/2018 | |
| KR | 10-2019-0049871 | | 5/2019 | |
| KR | 10-2010123 | | 8/2019 | |
| WO | WO-2017141957 | A1 * | 8/2017 | G01S 17/04 |
| WO | WO-2022043749 | A1 * | 3/2022 | G01S 17/931 |
| WO | WO-2022180449 | A1 * | 9/2022 | G01S 17/89 |
| WO | WO-2025176834 | A1 * | 8/2025 | G01S 17/89 |

* cited by examiner

FIG. 2

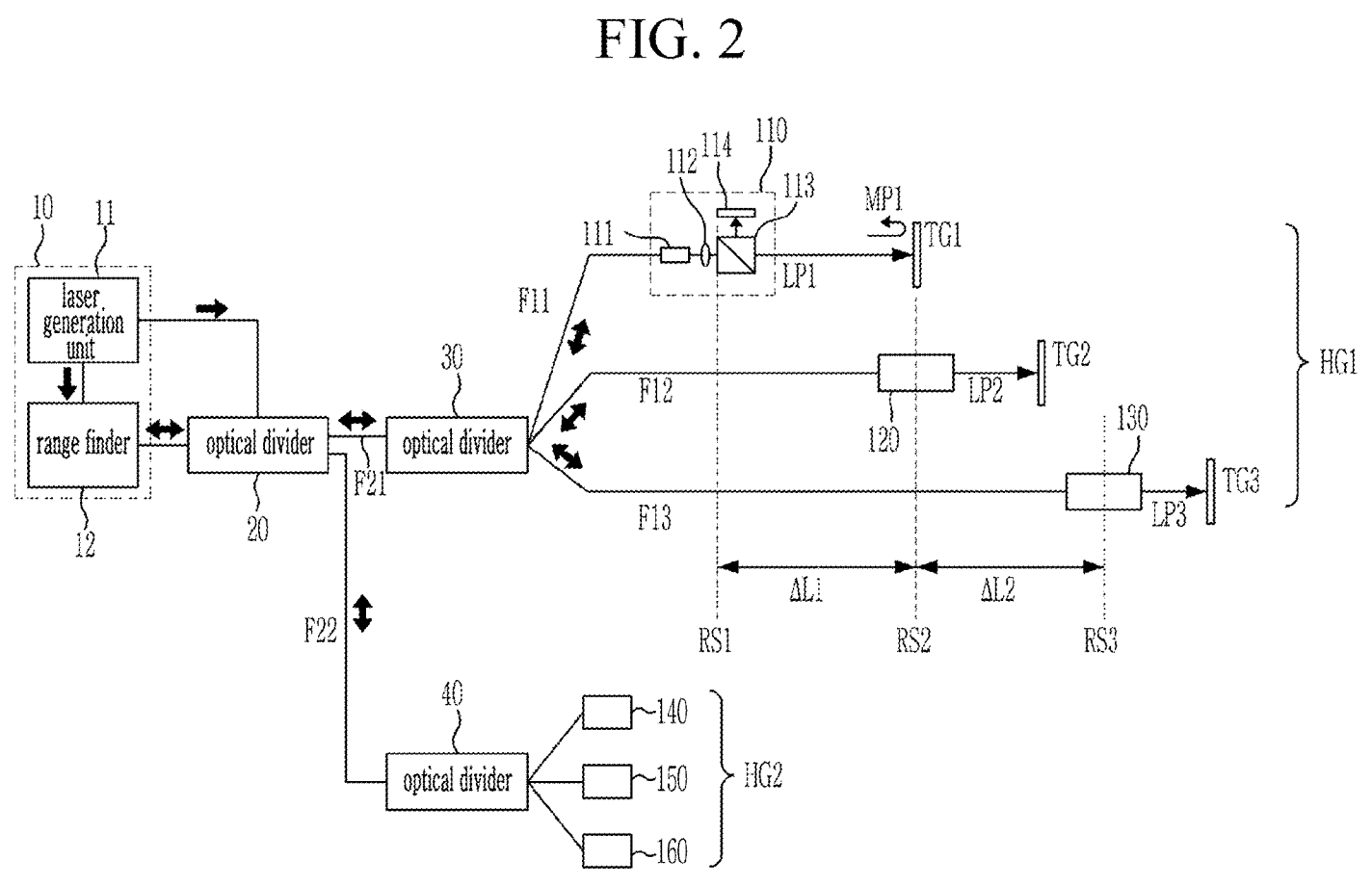

HG1
TG3
TG2
TG1
MP1
LP3
LP2
LP1
130
120
110
113
114
112
111
RS3
RS2
RS1
ΔL2
ΔL1
F11
F12
F13
HG2
140
150
160
optical divider
30
optical divider
40
F21
F22
optical divider
20
laser generation unit
11
range finder
12
10

DISTANCE MEASUREMENT HEAD AND MULTI-TARGET DISTANCE MEASUREMENT SYSTEM INCLUDING THE SAME

TECHNICAL FIELD

The present invention relates to a distance measurement system, and more particularly, to a multi-target distance measurement system capable of simultaneously or sequentially performing a distance measurement on a plurality of measurement targets and a distance measurement head used therein.

BACKGROUND ART

Recently, as industrial sites are becoming smart factories, there has been an increasing demand for technology to monitor, manage, and maintain the conditions of the plurality of apparatuses in a factory in real time. Various sensors are being applied to determine the condition of the apparatus, and in particular, multiple precision distance measurement sensors capable of being operated long term without interruption of measurement due to an external disturbance are required to monitor the apparatus structural deformation caused by heat, vibration, etc., generated from the external environment during processes, and the transfer/rotation driving characteristics of a specific part of the apparatus.

In the related art, a plurality of capacitance sensors or laser sensors are used for the above-described measurement. The capacitance sensors are easy to use and have high precision, but there are problems in that the measurement range is limited to 1 mm or less and the installation location is limited, and also the price is high. For this reason, there is a limitation in using the capacitance sensor as a sensor for multi-location monitoring. Among the laser sensors, displacement interferometer-based sensors have high measurement precision and high freedom of installation, but there are problems in that the existing measurement information is lost and it is difficult to apply multiple laser heads with a single interferometer in case that the laser beam is broken due to the external interference, and thus there is a limit to multi-monitoring.

DISCLOSURE

Technical Problem

The present invention has been made in an effort to provide a multi-target distance measurement system capable of monitoring real-time distance changes with high measurement precision by arranging and mounting a plurality of measurement heads on desired measurement sites of a plurality of apparatuses and applying one single range finder.

Technical Solution

An exemplary embodiment of the present invention provides a distance measurement head including: a reflection surface configured to reflect a part of a laser pulse transmitted from a laser light source unit toward the laser light source unit and generate a reference pulse; a beam splitter configured to distribute a measurement pulse received from a measurement target; and a position sensor configured to receive the measurement pulse distributed by the beam splitter, in which the measurement pulse is the laser pulse reflected from the measurement target and a distance between the reflection surface and the measurement target is measured based on a time difference between time at which the measurement pulse passing through the beam splitter reaches the laser light source unit and time at which the reference pulse reaches the laser light source unit.

Another embodiment of the present invention provides a multi-target distance measurement system, which includes the above-described plurality of measurement heads, including: a first optical divider configured to divide the laser pulse into a plurality of first optical paths; and a second optical divider optically connected to each of the first optical paths divided from the first optical divider and configured to divide the first optical path into one or more second optical paths, in which each of the measurement heads is optically connected to each of the second optical paths.

Advantageous Effects

According to an embodiment of the present invention, there is an advantage of performing real-time distance measurement with high precision by mounting a plurality of measurement heads at measurement locations of a plurality of apparatuses and using one single range finder.

In addition, according to an embodiment of the present invention, since the slope of the measurement target may be calculated or the distance to the measurement target may be corrected based on the detection result of a position sensor of each of the measurement heads, there is an advantage of being capable of measuring the distance with higher precision.

DESCRIPTION OF THE DRAWINGS

FIG. 2 is a view explaining a measurement principle of the multi-target distance measurement system according to an embodiment.

MODE FOR INVENTION

Figure 1:
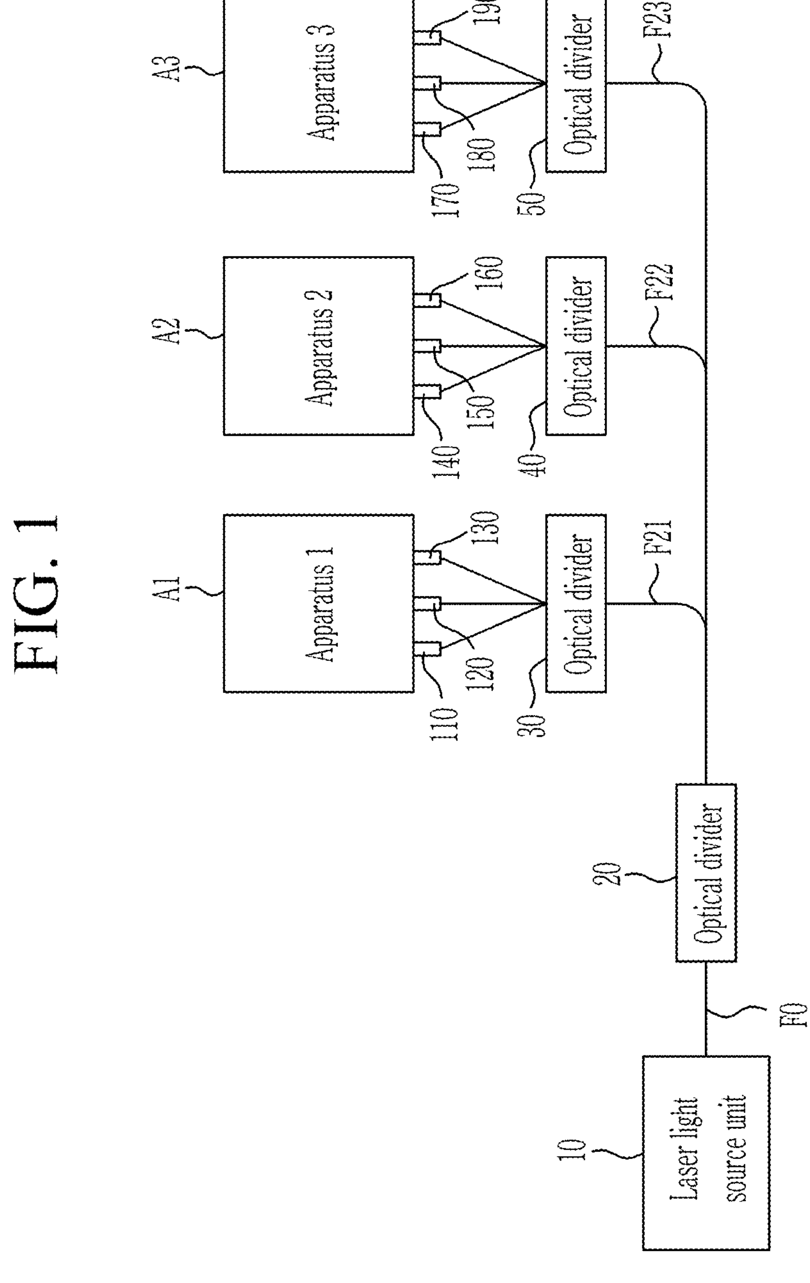
FIG. 1 is a view explaining a multi-target distance measurement system according to an embodiment of the present invention.

The above-mentioned objects, other objects, features, and advantages of the present invention will be easily understood with reference to the following exemplary embodiments associated with the accompanying drawings. However, the present invention is not limited to the exemplary embodiments to be described below and may be specified as other aspects. On the contrary, the embodiments introduced herein are provided to make the disclosed content thorough and complete, and sufficiently transfer the spirit of the present invention to those skilled in the art.

In the present specification, when a constituent element A is described as being coupled (or connected, attached, fastened, etc.) to another constituent element B, it means that the constituent element A is directly coupled to another constituent element B or a third constituent element may be interposed and coupled therebetween. Further, in the drawings, the length, area, width, volume, size, or thickness of the constituent elements are exaggerated for effective descriptions of technical contents.

In the present specification, when the terms "first" and "second" are used to describe the constituent elements, the constituent elements should not be limited by the terms. These terms are merely used to distinguish one constituent elements from the other constituent elements. The exemplary embodiments described and illustrated herein also include complementary exemplary embodiments thereof.

Unless particularly stated otherwise in the present specification, a singular form also includes a plural form. The term 'comprise', 'comprising', 'include', 'including' and 'consisting of' used in the specification does not exclude existence or addition of one or more other constituent elements in addition to the mentioned constituent element.

Hereinafter, the present invention will be described in detail with reference to the drawings. To describe the following specific exemplary embodiments, the various particular contents are proposed to more specifically describe the present invention and help understand the present invention. However, those who are knowledgeable in this field enough to understand the present invention may recognize that the present invention may be used without the various particular contents. It is noted that the description of the parts, which are commonly known and are not greatly related to the present invention, will not be described in order to avoid confusion when describing the present invention.

FIG. 1 is a block diagram schematically illustrating a multi-target distance measurement system according to an embodiment of the present invention. Referring to the drawing, a multi-target distance measurement system according to an embodiment includes a laser light source unit 10, one or more optical dividers 20, 30, 40, and 50, and a plurality of distance measurement heads (hereinafter referred to as "measurement heads") 110 to 190.

The laser light source unit 10 may include, for example, a laser generation unit configured to generate a femtosecond pulse laser, and a range finder configured to calculate a distance to a measurement target based on a laser pulse received from the measurement target.

Each of the optical dividers 20, 30, 40 and 50 divides a laser pulse transmitted from the laser light source unit 10 into a plurality of optical paths. Each of the optical dividers 20, 30, 40, and 50 may be implemented as, for example, an optical switch or an optical coupler.

In the illustrated embodiment, the laser light source unit 10 and a first optical divider 20 are optically connected by a first optical path F1. The first optical divider 20 is optically connected to each of second to fourth optical dividers 30, 40, and 50, respectively, by one or more second optical paths F21, F22, and F23, and thus the second to fourth optical dividers 30, 40, and 50 are disposed in parallel with each other. However, the serial/parallel arrangement combination of the first to fourth optical dividers 20, 30, 40, and 50 may of course be changed according to specific embodiments.

In the embodiment, each of the optical paths F1, F21, F22 and F23 may be implemented with an optical fiber. The optical path is not limited to the optical fiber and may be implemented with any optical transmission medium capable of transmitting light.

One or more optical paths are connected to each of the second to fourth optical dividers 30, 40, and 50, and the measurement heads 110 to 190 may be optically connected, one by one, to an end of each of the optical paths. Each of the measurement heads 110 to 190 is installed adjacent to any one of the apparatuses A1, A2 and A3 including a distance measurement target, and configured to measure an absolute distance between the measurement head and a specific position of each of the apparatuses A1, A2 and A3. In the illustrated embodiment, each of the second to fourth optical dividers 30, 40, and 50 is connected to three divided optical paths, and thus a total of nine measurement heads 110 to 190 are installed. However, the number of apparatuses or the number of measurement heads may vary depending on specific embodiments.

According to the above-described configuration, the laser pulse generated by the laser light source unit 10 passes through the first to fourth optical dividers 20, 30, 40, 50 and optical paths F1, F21, F22 and F23 which is optically connected therebetween, and is emitted to measurement targets of each of the apparatuses A1, A2 and A3 through the plurality of measurement heads 110 to 190. Then, measurement pulses reflected respectively from the measurement targets return back to the laser light source unit 10 through the optical dividers and optical paths. The laser light source unit 10 may calculate a distance to each measurement target based on each measurement pulse received according to the configuration described above.

FIG. 2 specifically illustrates some constituent elements of the multi-target distance measurement system illustrated in FIG. 1. In FIG. 2, for the convenience of description, of the constituent elements of FIG. 1, the laser light source unit 10, the first to third optical dividers 20, 30, and 40, and the first to sixth measurement heads 110 to 160 are only illustrated, and the remaining constituent elements are omitted.

Referring to FIGS. 1 and 2, the laser light source unit 10 may include a laser generation unit 11 configured to generate a laser pulse and a range finder 12 configured to measure a distance to a measurement target.

The laser generation unit 11 may generate a laser pulse used for distance measurement and transmit the laser pulse to the range finder 12 and the optical divider 20, respectively. In the embodiment, a femtosecond laser pulse is used as a laser pulse, and in this case, a distance may be measured with a resolution of less than a micrometer for a measurement distance of several meters.

The femtosecond laser pulse include a pulse width corresponding to $10^{-12}$ seconds to $10^{-15}$ seconds and a pulse train having a pulse interval (period) corresponding to several MHz to hundreds of MHz. A spectrum from the visible light band to the infrared band is generated depending on the gain medium used to generate the laser, and the spectrum width in the frequency band is several nm to several tens of nm. In the embodiment of the present invention, wavelengths in the spectral region between, for example, 1000 nm to 1100 nm, 1500 nm to 1600 nm, or 1900 nm to 2100 nm may be used to facilitate the supply of optical fibers and components.

The range finder 12 may receive a reference pulse and a measurement pulse from each of the measurement heads 110 to 190 and calculate a distance from the measurement head to each of the measurement targets based on a reception time difference between the reference pulse and the measurement pulse. Here, the reference pulse is a pulse in which the laser pulse generated by the laser generation unit 11 and transmitted to the measurement head is reflected from any reflection surface of each of the measurement heads and returns back to the range finder 12, and the measurement pulse is a pulse in which the laser pulse emitted from the measurement head to the measurement target is reflected from the measurement target and returns back to the range finder.

The range finder 12 may calculate a distance by measuring the transmission time of the laser pulse on the basis of Time of Flight (ToF). In one embodiment, the range finder 12 calculates a distance on the basis of a dual femtosecond laser light source and a nonlinear cross-correlation method. In this case, a cross-correlation signal is generated using the laser pulse received from the laser generation unit 11 and the reference pulse and measurement pulse received from the measurement head, and thus a distance between the reflection surface of the measurement head and the measurement target is calculated based on the generated cross-correlation signal.

The optical dividers 20, 30, 40 and 50 are devices that transmit the received laser pulse to one or more optical paths, and may be implemented as couplers or switches, for example. The coupler simultaneously distributes and transmits the laser pulse received from the laser generation unit 11 to the optical divider at the rear end or the plurality of measurement heads, and transmits the laser pulse (i.e., the reference pulse and measurement pulse) reflected from the optical divider at the rear end or the plurality of measurement heads toward the range finder 12. The switch sequentially transmits the laser pulse generated by the laser generation unit 11 to the optical divider at the rear end or the plurality of measurement heads, and sequentially transmits the laser pulse (the reference pulse or measurement pulse) reflected from the optical divider at the rear end or the plurality of measurement heads toward the range finder 12. In the embodiment, the switching speed of the switch may be, for example, nanoseconds to microseconds.

The plurality of second optical paths F21, F22 and F23 optically connecting each of the first optical divider 20 and the second to fourth optical dividers 30, 40 and 50 may be composed of optical fibers, and a plurality of third optical paths F31, F32, and F33 optically connecting the second optical divider and the first to third measurement heads 110, 120, and 130 may also be composed of optical fibers. Since it is preferred that the pulse polarization is maintained to be constant in the optical fiber while the laser pulse transmitted from the laser generation unit 11 is transmitted to the measurement heads 110 to 190, in the embodiment, the optical fiber may be composed of a polarization maintaining optical fiber. In addition, the laser pulse may preferably be composed of a dispersion compensation optical fiber to prevent the widening of the pulse width due to dispersion when the laser pulse passes through the optical fiber, and more preferably the laser pulse may be implemented with an optical fiber having both a polarization maintaining function and a dispersion compensation function.

Each of the measurement heads 110 to 190 is installed adjacent to one or more apparatuses. In the embodiment illustrated in FIGS. 1 and 2, a first measurement head group HG1 may measure the movement or structural deformation of a first apparatus A1, and the first measurement head group HG1 may include first to third measurement heads 110, 120, and 130. In this case, the first to third measurement heads 110, 120, and 130 are installed at respective ends of the plurality of third optical paths F31, F32, and F33 distributed from the second optical divider 30, and in the embodiment, lengths of the optical paths F31, F32 and F33 from the second optical divider 30 to the first to third measurement heads 110, 120, and 130 are designed to be different from each other. For example, as illustrated in FIG. 2, the optical path F32 of the second measurement head 120 is longer than the optical path F31 of the first measurement head 110 by a length of ΔL1, and the optical path F33 of the third measurement head 130 is longer than the optical path F32 of the second measurement head 120 by a length of ΔL2.

In case that the length of the optical fiber of each of the optical paths F31, F32 and F33 is short, and thus a measurement head does not reach a measurement position, the length of the optical fiber of each of the optical paths F31, F32 and F33 may be extended. It is preferred that the length of the extended optical fiber is two times (i.e., even multiples) a length Lc of a laser resonator of the laser generation unit 11. In case that the optical fiber is extended by even multiples of the length of the resonator, a receiving position on the time axis of the pulse (the reference pulse and measurement pulse) received by the range finder 12 may always be a constant position within one cycle of the pulse.

Each of the apparatuses A1, A2 and A3 includes a plurality of measurement targets. In the illustrated embodiment, since the first apparatus A1 includes three measurement targets TG1, TG2, and TG3, it will be understood that the first measurement head group HG1 also includes three measurement heads 110, 120, and 130. In this case, each of the measurement targets TG1 to TG3 may be a specific surface of the first apparatus, and structural deformation of the first apparatus A1 or motions such as movement or rotation of a specific constituent element may be measured by measuring a distance from each of the measurement heads 110, 120 and 130 to each of the measurement targets TG1 to TG3.

In this case, in order to measure the distance between each of the measurement heads 110, 120 and 130 and each of the measurement targets TG1, TG2 and TG3, laser pulses LP1, LP2 and LP3 from each of the measurement heads 110, 120 and 130 are emitted toward the measurement targets TG1, TG2 and TG3 to measure the distance between each of the measurement heads 110, 120 and 130 and each of the measurement targets TG1, TG2 and TG3, and each laser pulse needs to be reflected from the measurement target and returned back to the measurement head. To this end, a surface of the measurement target may preferably be composed of a material that reflects light well. In case that the surface of the measurement target is composed of a material that does not easily reflect light, a reflection surface may be generated by coating the surface with reflective tape or paint, or alternatively, a mirror or reflector may be installed.

After receiving the laser pulse from the laser generation unit 11, each of the first to ninth measurement heads 110 to 190 emits the laser pulse to each of the measurement targets, receives the laser pulse reflected from each of the measurement targets which is the measurement pulse and transmits the laser pulse toward the range finder 12. FIG. 2 is a block diagram illustrating a specific configuration of the first measurement head 110 according to the embodiment, and it will be understood that specific configurations of the second to ninth measurement heads 120 to 190 are omitted since each of the second to ninth measurement heads 120 to 190 is the same as or similar to the first measurement head 110.

Referring to the drawing, the first measurement head 110 according to the embodiment may include a connector 111, a collimator 112, a beam splitter 113, and a position sensor 114. The connector 111 is connected to the end of the third optical path F31 and outputs the laser pulse toward the collimator 112. The collimator 112 transforms the laser pulse into parallel light having the same light intensity across the cross section. The laser pulse LP1 passing through the collimator 112 is emitted toward the measurement target TG1.

In this case, in the illustrated embodiment, before a part of the laser pulse is output from the first measurement head 110, a part of the laser pulse is reflected by the reflection surface RS1 and returns back toward the range finder 12. Hereinafter, the reflected laser pulse is referred to as a reference pulse RP1. The reflection surface RS1 may be any optical element that is positioned on the transmission path of the laser pulse in the first measurement head 110 and may reflect at least a part of the laser pulse. For example, in the illustrated embodiment, the reflection surface RS1 may be one surface of the beam splitter 113 (an incident surface of the laser pulse). However, in an alternative embodiment, for example, the other surface of the beam splitter 113 (i.e., a surface from which the laser pulse is output) or an output surface of the connector 111 may serve as the reflection surface RS1.

The laser pulse LP1 passing without being reflected from the beam splitter 113 is emitted toward the measurement target TG1, reflected from the measurement target TG1 and returns back to the first measurement head 110 as a measurement pulse MP1. The beam splitter 113 distributes the measurement pulse MP1 received from the measurement target TG1. A part of the measurement pulse MP1 distributed from the beam splitter 113 is transmitted to the range finder 12 through the third optical path F31. Accordingly, the range finder 12 respectively and sequentially receives the reference pulse RP1 reflected from the reflection surface RS1 and the measurement pulse MP1 reflected from the measurement target TG1, and calculates the distance between the first measurement head 110 and the measurement target TG1 based on the difference in time when the two pulses RP1 and MP1 are received.

Another part of the measurement pulse MP1 distributed by the beam splitter 113 is transmitted to the position sensor PSD 114. The position sensor 114 detects the measurement pulse MP1 and accordingly generates an output signal, and a control unit (not illustrated) receiving the output signal may determine whether the first measurement head 110 and the measurement target TG1 are aligned (that is, whether the optical axis of the laser pulse LP1 coincides with the optical axis of the measurement pulse MP1) based on the output signal.

Figure 3:
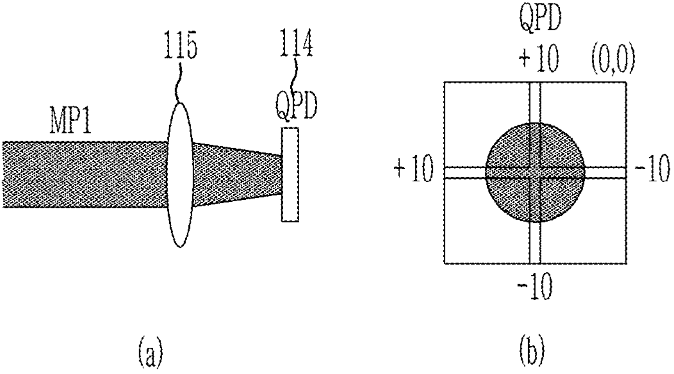
FIGS. 3 and 4 are views explaining output results of a position sensor of a measurement head according to the embodiment.
Figure 4:
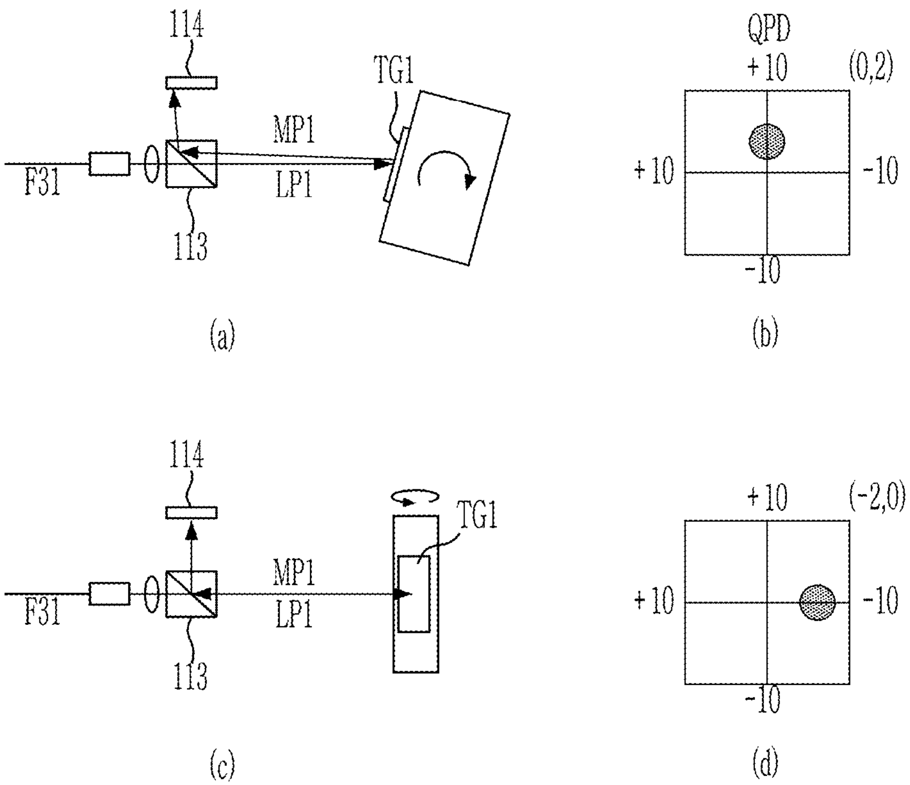

In this regard, FIGS. 3 and 4 are views illustrating exemplary output signals of the position sensor 114. Referring to FIG. 3A, the measurement pulse MP1 may reach the position sensor 114 via an optical element 115 such as a lens. In the embodiment, the position sensor 114 may be implemented as a quadrant photodiode QPD. As illustrated in FIG. 3B, the QPD is divided into four splitting elements, so that the degree of deviation from the center in each of horizontal and vertical directions may be output as a voltage signal.

When the laser pulse is emitted to the center of the QPD, the output signal is 0 volt. As the laser pulse deviates from the center, for example, a signal corresponding to a maximum of ±10 volts may be generated. For example, when the measurement pulse MP1 is incident on the center of the position sensor 114 as illustrated in FIG. 3B, of the output signals of the position sensor, a voltage signal of (0, 0) (i.e., 0 volt in both the vertical and horizontal directions) is output with respect to the horizontal and vertical directions.

However, for example, as illustrated in FIG. 4A or 4C, when the measurement head 110 and the measurement target TG1 are not aligned, the output signal of the position sensor 114 varies. For example, as illustrated in FIG. 4A, when the surface of the measurement target TG1 is inclined upward, the measurement pulse MP1 is incident above from the center of the QPD to output a voltage signal of, for example, (0, 2) (see FIG. 4B), and when the surface of the measurement target TG1 is inclined to the right as illustrated in FIG. 4C, the measurement pulse MP1 is incident on the right side of the center of the QPD to output a voltage signal of, for example, (−2, 0) (see FIG. 4D).

Figure 5:
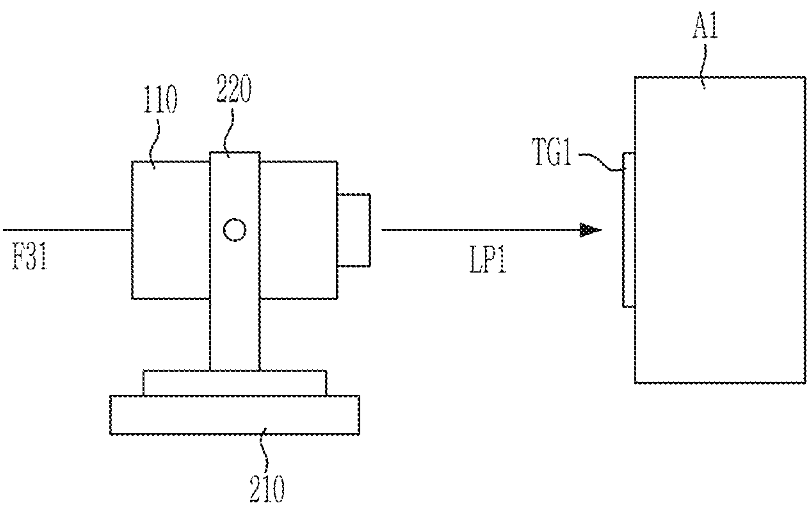
FIG. 5 is a view explaining the measurement head according to the embodiment.

As described above, in case that the first measurement head 110 and the measurement target TG1 are not aligned, in the embodiment, the first measurement head 110 may be rotated or moved to align with the measurement target TG1 based on the output signal of the position sensor 114. For example, FIG. 5 illustrates a mechanical unit that supports and moves the first measurement head 110 according to the embodiment. Referring to FIG. 5, the first measurement head 110 according to the embodiment may be movably supported by a mount 210 and a holder 220. The mount 210 may rotatably support the first measurement head 110 in the horizontal direction, and the holder 220 may rotatably support the first measurement head 110 in the vertical direction. Although not illustrated in the drawing, the mount 210 and the holder 220 may each be operated by a driving unit such as a motor, and a control unit (not illustrated) may control the driving unit based on the output signal of the position sensor 114 to align the first measurement head 110 with the measurement target TG1.

Meanwhile, as the position sensor 114, any sensor in addition to the quadrant photodiode QPD may be used. For example, in an alternative embodiment, any one of a lateral effect photodiode, a charged couple device (CCD) sensor, and a complementary metal oxide semiconductor field effect transistor (CMOSFET) sensor may be used as the position sensor 114.

Referring back to FIG. 2, the configuration and function of the first measurement head 110 as described above are the same as the remaining measurement heads 120 to 190. For example, the laser pulse LP2 returns back to the second measurement head 120 as the measurement pulse MP2 after the laser pulse LP2 output from the second measurement head 120 is reflected from the measurement target TG2. Then, a part of the returned measurement pulse MP2 is transmitted to the range finder 12 and another part of the returned measurement pulse MP2 is transmitted to the position sensor and used to determine whether the second measurement head 120 and the measurement target TG2 are aligned.

In addition, a part of the laser pulse is reflected from a reflection surface RS2 of the second measurement head 120 and returns back to the range finder 12 as a reference pulse RP2, and the range finder 12 calculates a distance between the second measurement head 120 and the measurement target TG2 based on the reference pulse RP2 and the measurement pulse MP2.

In addition, in the embodiment, the lengths of the optical paths from the first optical divider 20 to the first to ninth measurement heads 110 to 190 are set to be different from each other. For example, the optical path of the second measurement head 120 is longer than that of the first measurement head 110 by ΔL1, and the optical path of the third measurement head 130 is longer than that of the second measurement head 120 by ΔL2. In addition, although not illustrated in FIG. 2, the optical path of the fourth measurement head 120 is longer than that of the third measurement head 130 by a predetermined length, and the optical path of the fifth measurement head 150 is longer than that of the fourth measurement head 140 by a predetermined length. In this way, the optical path up to the ninth measurement head 190 is designed to be getting longer, so that the optical path to each of the measurement heads 110 to 190 may be configured to be different.

Hereinafter, a multi-target measurement method according to each embodiment when the first to fourth optical dividers 20, 30, 40, and 50 are implemented with couplers and switches will be described.

Figure 6:
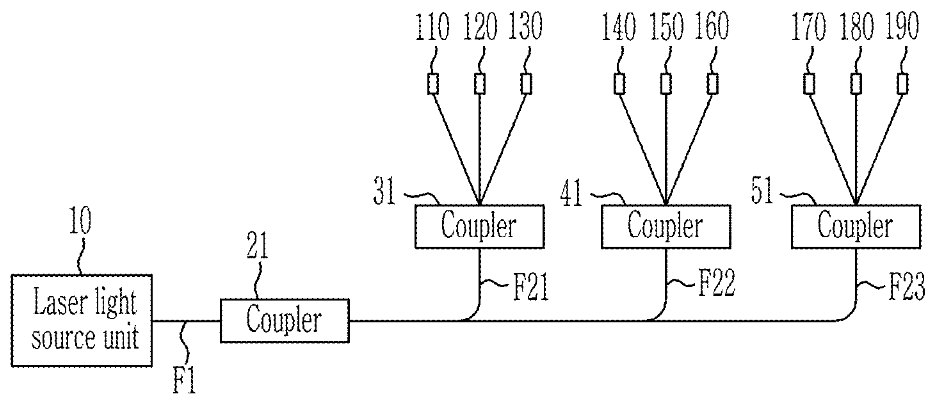
FIG. 6 is a view explaining a configuration of a multi-target distance measurement system according to a first embodiment.

FIG. 6 schematically illustrates the configuration of a multi-target distance measurement system according to the first embodiment. Compared to FIG. 1, in the embodiment of FIG. 6, the first to fourth optical dividers 20, 30, 40 and 50 are implemented as first to fourth couplers 21, 31, 41, and 51, respectively. For the convenience of description, three measurement heads are connected to each of the second to fourth couplers 31, 41, and 51 as in FIG. 1.

As described above, in case that all of the first to fourth optical dividers 20, 30, 40, and 50 are implemented as the couplers, the range finder 12 simultaneously receives a plurality of reference pulses RP1 to RP9 and a plurality of measurement pulses MP1 to MP9 from the plurality of measurement heads 110 to 190. Therefore, as described above, the lengths of the optical paths between the measurement heads are designed to be different from each other, and accordingly, the plurality of reference pulses and measurement pulses received by the range finder 12 do not overlap each other so that a reference pulse and measurement pulse of a specific measurement head is distinguished from a reference pulse and measurement pulse of other measurement heads.

Figure 7:
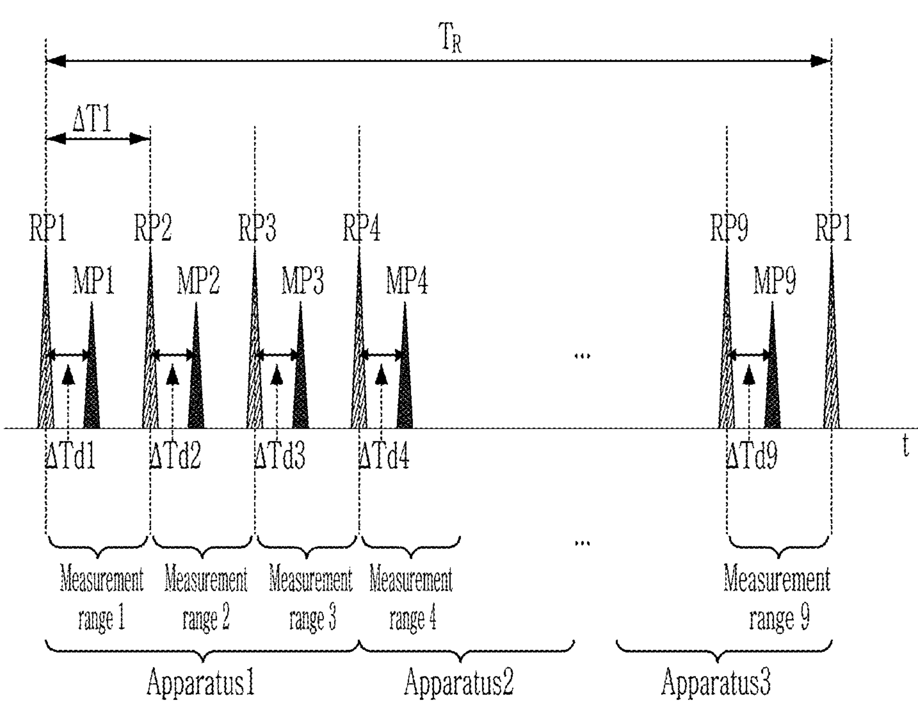
FIG. 7 is a view explaining a pulse signal when measuring a multi-target distance according to the first embodiment.

For example, FIG. 7 schematically illustrates a pulse signal received by the range finder 12 when measuring multi-target distances with this configuration. In FIG. 7, $T_R$ is a period of the laser pulse generated by the laser generation unit 11 and is equal to Lc/C (Lc is the length of the resonator and C is the speed of light). Since the laser pulse is repeatedly generated every period $T_R$ in the laser generation unit 11 and transmitted to each of the measurement heads 110 to 190, as illustrated in FIG. 7, all reference pulses RP1 to RP9 and all measurement pulses MP1 to MP9 are also received by the range finder 12 repeatedly at the laser pulse period $T_R$.

Since the lengths of the optical paths between the measurement heads 110 to 190 are configured to be different from each other, the range finder 12 may sequentially receive the plurality of reference pulses and measurement pulses without overlapping each other. For example, as illustrated in FIG. 7, the second reference pulse RP2 and the second measurement pulse MP2 are sequentially received with a time difference ΔTd2 after the first reference pulse RP1 and the first measurement pulse MP1 are received with a time difference ΔTd1. In this way, the ninth reference pulse RP9 and the ninth measurement pulse MP9 are sequentially received. In this case, the time difference ΔTd1, ΔTd2, . . . ΔTd9 between the reference pulse and the measurement pulse at each of the measurement heads 110 to 190 is the time corresponding to the distance difference from each of the measurement heads 110 to 190 to each of the measurement targets TG1 to TG9. That is, the distance between each of the measurement heads 110 to 190 and each of the measurement targets TG1 to TG9 is calculated based on each time difference ΔTd1, ΔTd2, . . . ΔTd9.

Meanwhile, as illustrated in FIG. 2, a reception time difference ΔT1, ΔT2, . . . between each reference pulse is a time difference corresponding to each of the length differences ΔL1, ΔL2, . . . of the optical path from the laser light source unit 10 to each of the measurement heads 110 to 190. For example, in case that the optical path of each of the measurement heads 110 to 190 is configured to have a difference by a predetermined length ΔLf from the first measurement head 110 to the ninth measurement head 190 (i.e., ΔL1=ΔL2= . . . =ΔL9=ΔLf), the range finder 12 sequentially receives each of the reference pulses RP1 to RP9 at a time interval corresponding to the length ΔLf.

As illustrated in FIG. 7, for example, the first measurement pulse MP1 of the first measurement head 110 should be positioned between the first reference pulse RP1 and the second reference pulse RP2. That is, a minimum interval of the time difference ΔTd1 between the first reference pulse RP1 and the first measurement pulse MP1 is related to a time interval in which the first reference pulse (RP1) and the first measurement pulse (MP1) do not overlap and are distinguished from each other so that the reception time of each pulse may be distinguished (i.e., a maximum time resolution of the range finder 12). Therefore, a minimum measurable distance to the measurement target TG1 which the first measurement head 110 is capable of measuring corresponds to the minimum interval of the time difference ΔTd1.

A maximum interval of the time difference ΔTd1 between the first reference pulse RP1 and the first measurement pulse MP1 is related to a resolution of the range finder in which the first measurement pulse MP1 and the second reference pulse RP2 do not overlap and are distinguished from each other so that each pulse may be distinguished. Therefore, a maximum measurable distance of the first measurement head 110 is determined within a limit in which the range finder 12 may distinguish the first measurement pulse MP1 and the second reference pulse MP2. Similarly, for the second measurement head 120 to the ninth measurement head 190, the minimum measurable distances and the maximum measurable distances are determined by the same principle as described above.

Therefore, in the embodiment of the present invention, it will be understood that a measurable distance of any specific measurement head of the measurement heads 110 to 190 is determined based on the time difference ΔT1, ΔT2, . . . between a reception time when the range finder 12 receives a reference pulse of the corresponding measurement head and a reception time when the range finder 12 receives the next reference pulse, and that a lower limit (a minimum measurable distance) and an upper limit (a maximum measurable distance) of a measurement range are determined according to the resolution of the range finder 12 capable of distinguishably receiving the two reference pulses.

According to the above-described embodiment, assuming that the laser pulse period $T_R$ is constant, as the number of measurement heads 110 to 190 decreases, the reception time difference ΔT1, ΔT2, . . . between the reference pulses may be getting larger, thereby increasing the distance measurement range of each of the measurement heads. As the number of measurement heads 110~190 increases, the distance measurement range decreases. Therefore, in a specific embodiment, it is preferable that the number of measurement heads is adjusted in consideration of the distance to the measurement target.

Figure 8:
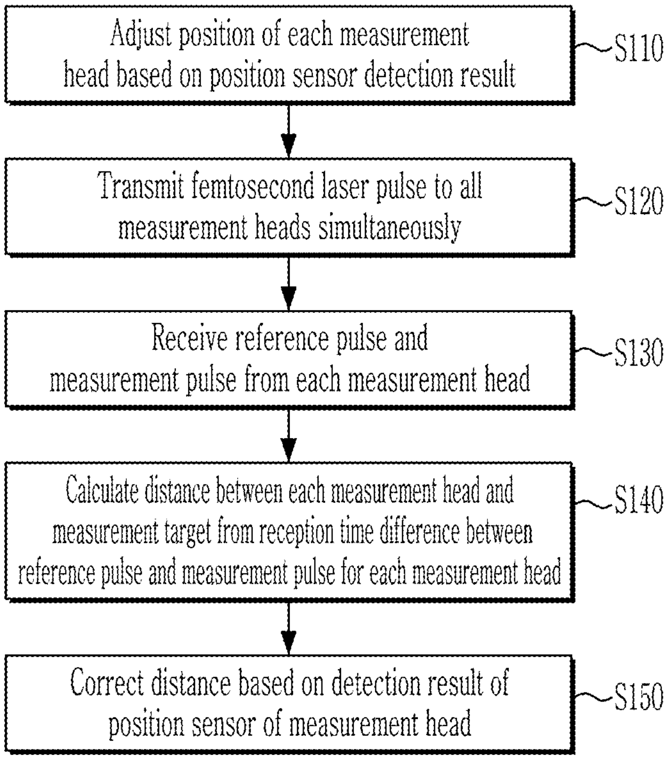
FIG. 8 is a flowchart explaining a multi-target distance measurement method according to the first embodiment.

FIG. 8 is a flowchart explaining the multi-target distance measurement method according to the first embodiment. It is assumed that the multi-target distance measurement system according to the first embodiment includes the plurality of couplers 21, 31, 41, and 51 and the plurality of measurement heads 110 to 190, as illustrated in FIG. 6.

Referring to FIG. 8, first, in step S110, the multi-target distance measurement system is installed in one or more measurement target apparatuses, and each of the measurement heads 110 to 190 is set. For example, a position of each of the measurement heads 110 to 190 is adjusted on the basis of a detection result of the position sensor 114 of each of the measurement heads 110 to 190. That is, as described with reference to FIGS. 3 to 5, each of the measurement heads 110 to 190 may be moved based on the output signal of the position sensor 114 to align each of the measurement heads and each of the measurement targets. As described above, in step S120, a laser pulse is generated in the laser light source unit 10 and transmitted to each of the measurement heads 110 to 190 after the multi-target distance measurement system is installed to the apparatus to be measured. In this case, since all optical dividers 20, 30, 40, and 50 are implemented as the couplers 21, 31, 41, and 51 in the first embodiment, laser pulses are simultaneously transmitted toward all the measurement heads 110 to 190.

A part of the laser pulse transmitted to each of the measurement heads 110 to 190 is reflected on the reflection surface and returns back to the laser light source unit 10 as a reference pulse. After reaching the measurement target, the remaining part of the laser pulse is reflected and returns back to the laser light source unit 10 as a measurement pulse (step S130). The range finder (12) of the laser light source unit (10) calculates a distance between each of the measurement heads and measurement target based on the reception time difference ΔTd1, ΔTd2, . . . , ΔTd9 of the reference pulse and measurement pulse received from each of the measurement heads (step S140).

Thereafter, step S150 of measuring a slope of the measurement target or correcting the distance to the measurement target based on the detection result of the position sensor 114 of the measurement head may be selectively further included. For example, as illustrated in FIG. 4A, in case that the measurement target TG1 is inclined, since the measurement pulse MP1 is incident at the point deviated from the center of the position sensor 114, the degree to which the measurement target TG1 is inclined from the initial condition may be measured depending on the detection result of the position sensor.

In addition, in case that the measurement target TG1 is inclined as described above, the path (length) of the measurement pulse MP1 passing through the beam splitter 113 and proceeding to the optical path F31 slightly increases, which causes an error in calculating the distance to the measurement target. Therefore, in the embodiment of the present invention, it is possible to calculate how much the path of the measurement pulse MP1 has increased based on the detection result of the position sensor 114 and correct the distance to the measurement target based on this increment.

Figure 9:
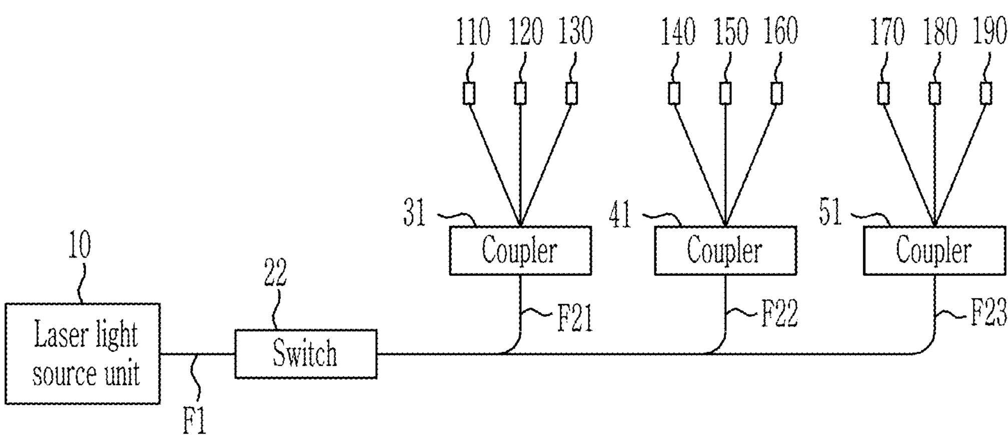
FIG. 9 is a view explaining a configuration of a multi-target distance measurement system according to a second embodiment.

FIG. 9 schematically illustrates a configuration of a multi-target distance measurement system according to the second embodiment. Compared to FIG. 1, in the second embodiment of FIG. 9, the first optical divider 20 is implemented as a switch 22, and the second to fourth optical dividers 30, 40, and 50 are respectively implemented as the second to fourth couplers 31,41 and 51. That is, compared to the first embodiment of FIG. 6, the second embodiment is the same as the first embodiment except that the switch 22 is used instead of the coupler 21.

As described above, in case that the first optical divider 20 is implemented as the switch 22 and the second to fourth optical dividers 30, 40, and 50 are implemented as couplers, since the switch 22 sequentially transmits a laser pulse to eachthe couplers 31, 41 and 51, and each of the couplers 31, 41 and 51 simultaneously distributes and transmits the laser pulse to each of the measurement heads, the range finder 12 sequentially receives reference pulses and measurement pulses for each of the couplers 31, 41 and 51.

Figure 10:
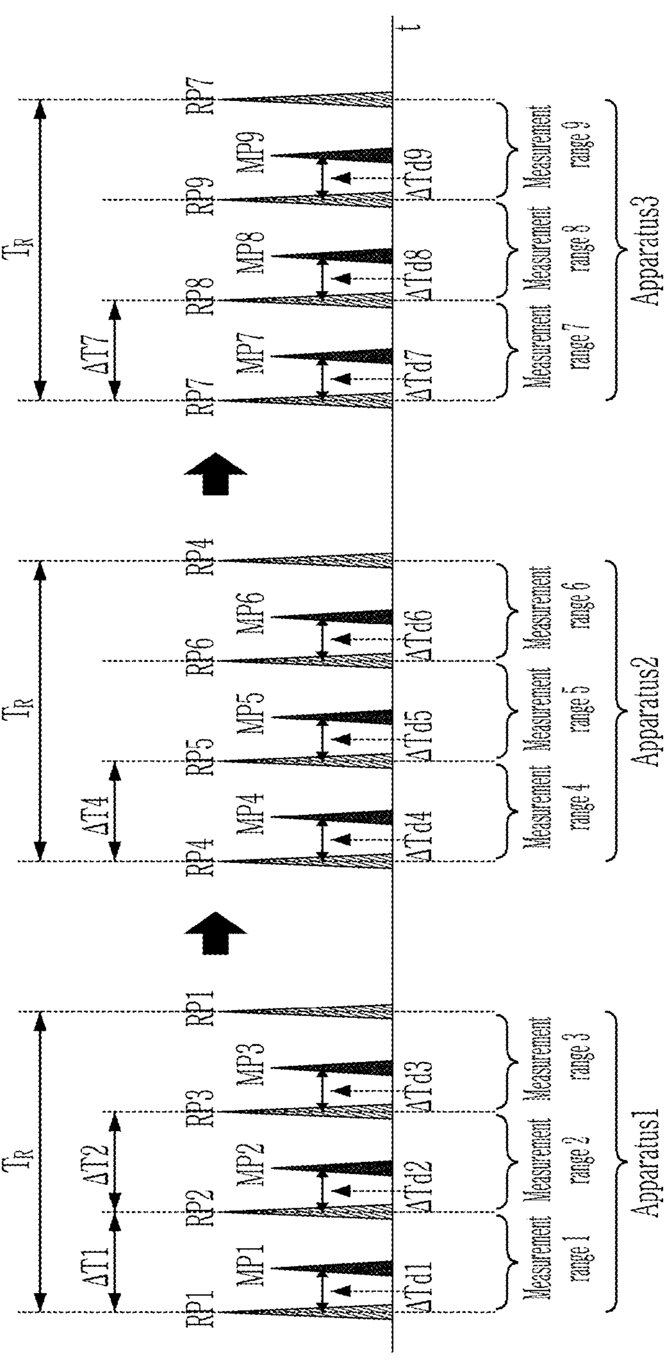
FIG. 10 is a view explaining a pulse signal when measuring a multi-target distance according to the second embodiment.

For example, FIG. 10 schematically illustrates a pulse signal received by the range finder 12 when measuring multi-target distances with the above-described configuration. As illustrated in FIG. 7, $T_R$ is a period of the laser pulse generated by the laser generation unit 11, and a time difference ΔTd1, ΔTd2 . . . ΔTd9 between a reference pulse and a measurement pulse at each of the measurement heads 110 to 190 is the time corresponding to a distance difference from each of the measurement heads 110 to 190 to each of the measurement targets TG1 to TG9. As illustrated in FIG. 2, a reception time difference ΔT1, ΔT2, . . . between the reference pulses is a time difference corresponding to each of the optical path length differences ΔL1, ΔL2, . . . to each of the measurement heads 110 to 190.

As illustrated in the second embodiment, in case that the first optical divider 20 is implemented as the switch 22 and the second to fourth optical dividers 30, 40, and 50 are implemented as the couplers 31, 41, and 51, the range finder 12 only needs to receive a reference pulse and measurement pulse from one of the couplers 31, 41 and 51 within one period $T_R$.

That is, as illustrated in FIG. 10, the range finder 12 only needs to receive reference pulses RP1 to RP3 and measurement pulses MP1 to MP3 of the first to third measurement heads 110 to 130 coming from the second coupler 31 during a period $T_R$ of pulse which is first received, and receive reference pulses RP4 to RP6 and measurement pulses MP4 to MP6 of the fourth to sixth measurement heads 140 to 160 coming from the third coupler 41 during the next pulse period $T_R$ by a switching operation of the switch 22, and thereafter receive reference pulses RP7 to RP9 and measurement pulses MP7 to MP9 of the seventh to ninth measurement heads 170 to 190 coming from the fourth coupler 51 during the next pulse period $T_R$ by the switching operation of the switch 22.

As seen from the comparison with FIG. 7, according to the second embodiment, since the number of reference pulses and measurement pulses to be received within one period $T_R$ of the laser pulse is smaller than that of the first embodiment, the reception time difference ΔT1, ΔT2 . . . between reference pulses may be increased. Therefore, there is an advantage of increasing the distance measurement range of each of the measurement heads.

Figure 11:
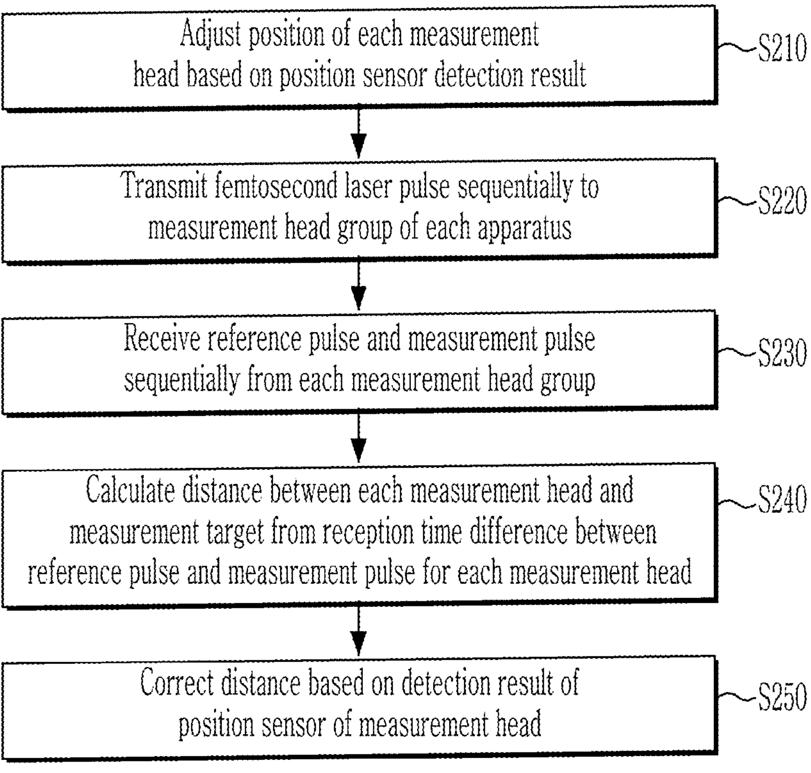
FIG. 11 is a flowchart explaining a multi-target distance measurement method according to the second embodiment.

FIG. 11 is a flowchart explaining a multi-target distance measurement method according to the second embodiment. Compared to FIG. 8 which is a flowchart according to the first embodiment, step S110 of initially setting of the multi-target distance measurement system is the same or similar. In step S220 after setting the system, a laser pulse generated by the laser light source unit 10 is transmitted to each of the measurement heads 110 to 190. In this case, since the first optical divider 20 is implemented as the switch 22 in the second embodiment, the laser pulse passing through the switch 22 is sequentially transmitted to the respective couplers 31, 41, and 51, and each of the couplers 31, 41 and 51 will simultaneously transmit the laser pulse to the measurement head connected to each of the couplers.

Therefore, in step S230, the range finder 12, as illustrated in FIG. 10, receives a reference pulse and measurement pulse from one of the couplers 31, 41 and 51 for each pulse period, and calculates a distance between each of the measurement heads and measurement target (step S240) based on the time difference ΔTd1, ΔTd2 . . . , ΔTd9 of the reference pulse and measurement pulse of each of the measurement heads which are received.

Then, in the embodiment, a gradient of the measurement target may be calculated or an operation to correct the distance to the measurement target may be performed depending on the detection result of the position sensor 114 (step S250). Because step S250 is the same as or similar to step S150 of FIG. 8, a description thereof will be omitted.

Figure 12:
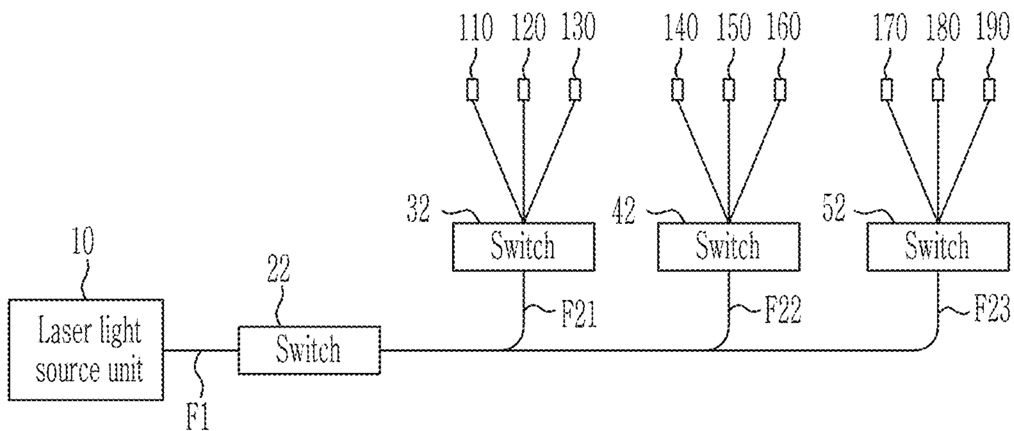
FIG. 12 is a view explaining a configuration of a multi-target distance measurement system according to a third embodiment.

FIG. 12 schematically illustrates a configuration of a multi-target distance measurement system according to the third embodiment. Compared to FIG. 1, in the third embodiment of FIG. 12, all of the first to fourth optical dividers 20, 30, 40, and 50 are implemented as switches 22, 32, 42, and 52. As described above, in case that all optical dividers (20, 30, 40, 50) are implemented as switches 22, 32, 42 and 52, each of the switches 22, 32, 42 and 52 may sequentially transmit a laser pulse one by one for each pulse period $T_R$ to the next switch or measurement head. Therefore, the range finder (12) also sequentially receives a reference pulse and a measurement pulse for each pulse period.

Figure 13:
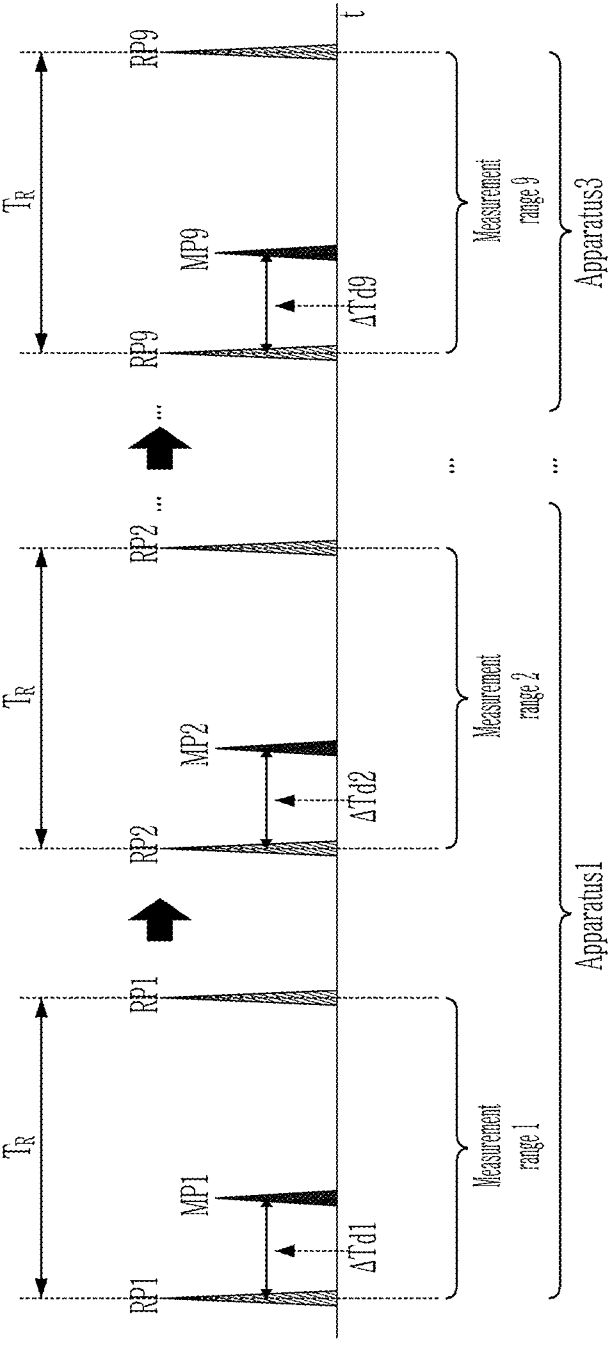
FIG. 13 is a view explaining a pulse signal when measuring a multi-target distance according to the third embodiment.

For example, FIG. 13 schematically illustrates a pulse signal received by the range finder 12 when measuring multi-target distances by the above-described configuration. As illustrated in the third embodiment, in case that all optical dividers 20, 30, 40, and 50 are implemented as switches 22, 32, 42, and 52, the range finder 12 may receive only a reference pulse and measurement pulse of one measurement head 110 to 190 within one period $T_R$. That is, as illustrated in FIG. 13, the reference pulse RP1 and measurement pulse MP1 of the first measurement head 110 are received during the first pulse period $T_R$, and then, the reference pulse RP2 and measurement pulse MP2 of the second measurement head 120 are received during the next pulse period $T_R$. This operation may be repeated until the reference pulse RP9 and measurement pulse MP9 of the ninth measurement head 190 are received.

As seen from the comparison with FIGS. 7 and 10, according to the third embodiment, since only one reference pulse and one measurement pulse need to be received within one period $T_R$ of the laser pulse, the reception time difference ΔT1, ΔT2 . . . between reference pulses may be increased. Therefore, there is an advantage in that a measurement target at a longer distance may be measured compared to other embodiments.

As described above, those skilled in the art to which the present invention pertains may understand that various modifications and variations are possible from the description of this specification. For example, in the embodiment of FIG. 9, the second to fourth optical dividers are all implemented as couplers 31, 41, and 51, and in the embodiment of FIG. 12 the second to fourth optical dividers are all implemented as switches 32, 42, and 52, however, in an alternative embodiment, some of the second to fourth optical dividers may be implemented as couplers and the remaining may be implemented as switches. Accordingly, the measurable range of each of the measurement heads may be adjusted in various ways.

Therefore, the scope of the present invention should not be limited to the described exemplary embodiments, and should be defined by not only the claims to be described below, but also those equivalents to the claims.

DESCRIPTION OF SYMBOL

| | |
|---|---|
| 10: Laser light source unit | 11: Laser generation unit |
| 12: Range finder | 20, 30, 40, 50: Optical divider |
| 21, 31, 41, 51: Coupler | 22, 32, 42, 52: Switch |
| 110 to 190: Measurement head | |
| 111: Connector | 112: Collimator |
| 113: Beam splitter | 114: Position sensor |

The invention claimed is:

1. A multi-target distance measurement system comprising:

one or more optical dividers configured to divide a laser pulse into a plurality of optical paths; and measurement heads optically connected one by one to an end of each of the plurality of optical paths, wherein each of the measurement heads comprises:

a reflection surface configured to reflect a part of a laser pulse transmitted from a laser light source unit toward the laser light source unit and generate a reference pulse;

a beam splitter configured to distribute a measurement pulse received from a measurement target; and a position sensor configured to receive the measurement pulse distributed by the beam splitter, wherein the measurement pulse is the laser pulse reflected from the measurement target, and a distance between the reflection surface and the measurement target is measured based on a time difference between time at which the measurement pulse passing through the beam splitter reaches the laser light source unit and time at which the reference pulse reaches the laser light source unit, and wherein lengths of the optical paths from the one or more optical dividers to the measurement heads are configured to be different from each other.

2. The multi-target distance measurement system of claim 1, wherein:

an optical axis of the laser pulse emitted toward the measurement target and an optical axis of the measurement pulse are aligned to coincide with each other on the basis of a detection result of the position sensor.

3. The multi-target distance measurement system of claim 2, comprising:

a holder configured to rotatably support the measurement head in a vertical direction; and a mount configured to rotatably support the measurement head in a horizontal direction.

4. The multi-target distance measurement system of claim 1, wherein:

the position sensor comprises any one of a quadrant photodiode (QPD), a lateral effect photodiode, a CCD sensor, and a CMOS sensor.

5. The multi-target distance measurement system of claim 1, wherein:

each of the plurality of optical paths is composed of an optical fiber.

6. The multi-target distance measurement system of claim 1, wherein:

a gradient of the measurement target is calculated based on the detection result of the position sensor of the measurement head.

7. The multi-target distance measurement system of claim 1, further comprising:

a laser generation unit configured to generate the laser pulse; and a range finder configured to receive a reference pulse and measurement pulse from each of the measurement heads and calculate a distance between the reflection surface and the measurement target based on a reception time difference between the reference pulse and the measurement pulse.

8. The multi-target distance measurement system of claim 7, wherein:

a measurable distance of each of the measurement heads is determined based on a time interval between a reception time at which the range finder receives a reference pulse of the measurement head and a reception time of the next reference pulse received thereafter.

9. The multi-target distance measurement system of claim 1, wherein:

the one or more optical dividers comprise:

a first optical divider 20 configured to divide the laser pulse into a plurality of first optical paths; and second optical dividers 30, 40 and 50 configured to be optically connected to each of the first optical paths divided by the first optical divider and divide the first optical path into at least one or more second optical paths.

* * * * *